(12) United States Patent
Becker

(10) Patent No.: US 6,750,559 B2
(45) Date of Patent: Jun. 15, 2004

(54) WIND POWER PLANT WITH A MOVABLE CONTAINER

(75) Inventor: Markus Becker, Rheine (DE)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/126,178

(22) Filed: Apr. 19, 2002

(65) Prior Publication Data

US 2003/0071469 A1 Apr. 17, 2003

(30) Foreign Application Priority Data

Apr. 20, 2001 (DE) .......................... 101 19 429

(51) Int. Cl.$^7$ ................................ F03D 9/00
(52) U.S. Cl. ............................ 290/55; 290/54
(58) Field of Search ..................... 290/44, 55, 52

(56) References Cited

U.S. PATENT DOCUMENTS

| | | | | |
|---|---|---|---|---|
| 4,297,071 A | * | 10/1981 | Dunbar | .................. 414/542 |
| 6,408,575 B1 | * | 6/2002 | Yoshida et al. | ............... 52/40 |

FOREIGN PATENT DOCUMENTS

| | | |
|---|---|---|
| AT | 401 674 B | 9/1994 |
| DE | 296 03 278 U1 | 6/1996 |
| DE | 196 47 515 A1 | 5/1998 |
| DE | 197 41 988 A1 | 4/1999 |
| DE | 199 62 453 C1 | 7/2001 |
| DE | 100 13 442 C1 | 10/2001 |
| DE | 10013442 C1 * | 10/2001 | ........... F03D/11/04 |
| DE | 100 28 513 A1 | 1/2002 | |
| EP | 1101934 A2 * | 5/2001 | ............. F03D/1/06 |
| EP | 1251268 A2 * | 10/2002 | ........... F03D/11/02 |
| EP | 1251306 A2 * | 10/2002 | ............. F16M/9/00 |
| EP | 1291521 A1 * | 3/2003 | ........... F03D/11/00 |
| WO | WO 96/10130 A1 | 4/1996 | |

* cited by examiner

Primary Examiner—Burton S. Mullins
Assistant Examiner—Yahveh Comas
(74) Attorney, Agent, or Firm—Blakely, Sokoloff, Taylor & Zafman LLP

(57) ABSTRACT

The invention involves a wind power plant for converting wind power into electric energy and a process for replacing machine parts of the housing of a wind power plant of this type using on-board mechanisms. According to the invention, the wind power plant has a tower, a housing that is mounted onto the tower and functions to receive machine parts that include at least one gear and one generator, whereby the housing also has a longitudinal axis oriented essentially crosswise to the tower axis, and, on the underside of a housing part that is set off at a distance from the tower in the direction of the longitudinal axis, has an opening that serves the purpose of allowing machine parts to be moved through it, and the wind power plant also has an on-board crane arranged in the housing in order to convey objects in the direction of the tower axis. Furthermore, the wind power plant has a container functioning to receive structural parts, whereby the container can be moved underneath the opening in the direction of the longitudinal axis from an operating position, in which an area of the opening near the tower is covered by the container, into a mounting position, in which this area of the opening is unblocked.

10 Claims, 2 Drawing Sheets

WIND POWER PLANT WITH A MOVABLE CONTAINER

Figure 1:
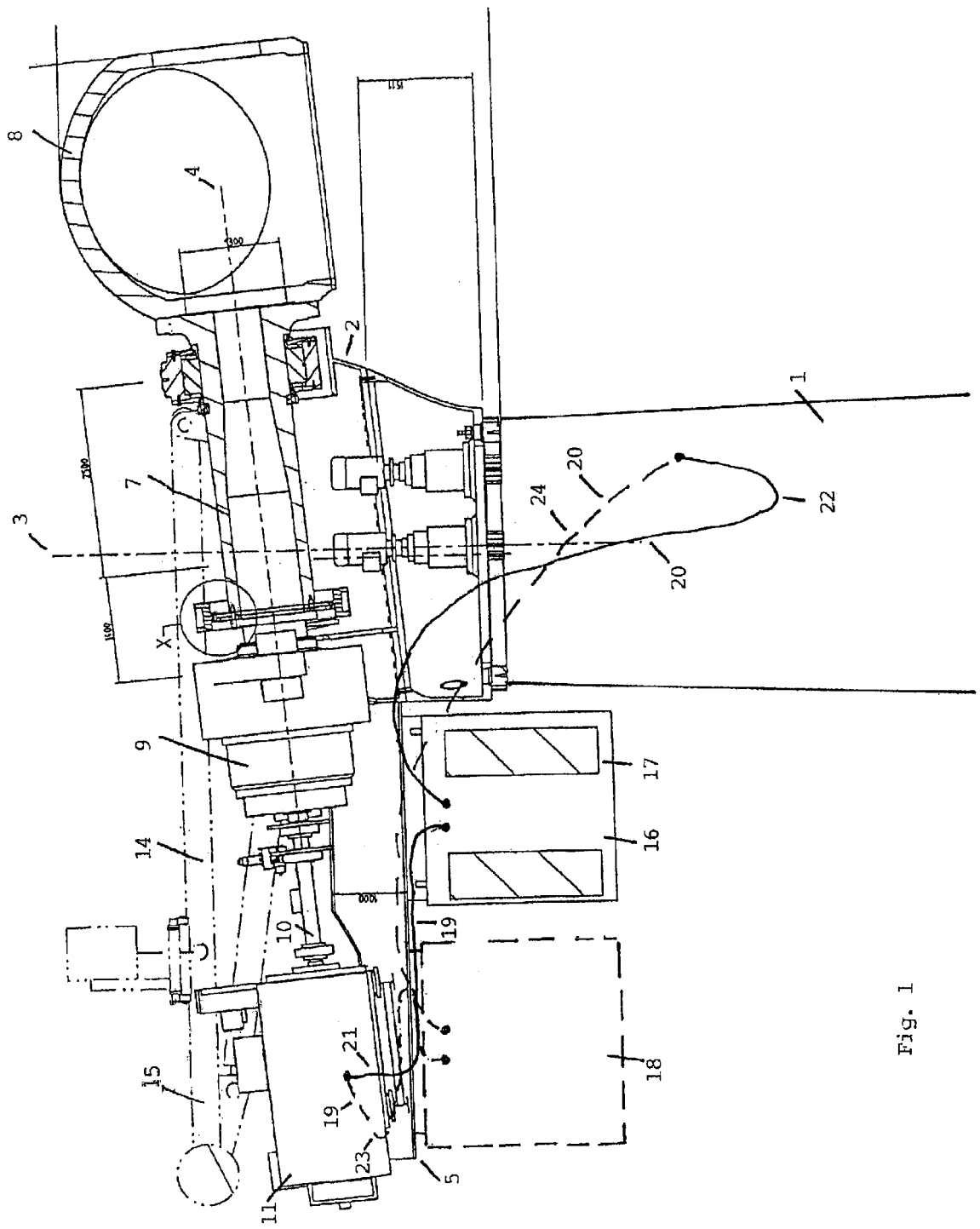

The invention involves a wind power plant for converting wind power into electric energy which has a tower, a housing that is mounted onto the tower and functions to receive machine parts that include at least one gear and one generator, whereby the housing also has a longitudinal axis oriented essentially crosswise to the tower axis, and, on the underside of a housing part that is set off at a distance from the tower in the direction of the longitudinal axis, has an opening that serves the purpose of allowing machine parts to be moved through it, and the wind power plant also has an on-board crane arranged in the housing in order to convey objects in the direction of the tower axis. Furthermore, the invention involves a process for replacing machine parts of the housing of a wind power plant using mechanisms that are on-board.

Wind power plants of this type are disclosed in the German patents DE 196 47 515 A1 and DE 197 41 988 A1. In these patents, processes are described for the construction of a wind power plant, in which for the construction of the tower performed by setting individual tower segments on top of each other, a crane that can be driven up along these segments is used, and this crane also conveys the machine housing (also called the gondola) and its machine parts to the top of the tower. The machine parts primarily include the rotor, which consists of a rotor hub having at least one rotor blade, the main shaft with shaft bearing, the generator and the gear connected between the shaft and the generator. These main components are contained in the gondola that is mounted onto the tower and form the drive train of the wind power plant. As during the assembly, a crane is necessary during the replacement of one of these main components as well as for the mounting and the replacement of the rotor. For this purpose, it is possible to provide the wind power plant with an on-board crane system, as is described in the patent AT-PS 40 16 74. A concept for wind energy was already presented to the public at the Trade Fair "Sustain '99-The World Sustainable Energy Fair" (May 25 to 27, 1999) for the first time by the applicant, in which the generator is let down out of the machine housing, and conveyed into it, via an on-board crane system through an opening in the wall of the floor of the machine housing.

In state of the art wind power plants, in addition to the parts that form the drive train, such as rotors, shafts, gears, and generators, additional structural parts such as transformers and other electrical components are arranged behind the generator in the gondola in an extension of the drive train. This requires a gondola that is extended beyond the length required to accommodate the drive train. Since the structural parts are heavy and are arranged at the positions of the gondola which are distant from the tower that functions as a center of support, the gondola must be manufactured from very stable material, in order to withstand the forces that occur due to the lever action of the structural parts.

The construction of the gondola that results from this is thus characterized by large dimensions in the direction of the longitudinal axis and by the use of very stable materials, which makes the wind power plant very heavy and expensive. In view of these problems in the state of the art, the purpose of the invention is to prepare a wind power plant of the type named at the beginning, having a gondola that has a more compact, cost-effective construction and that at the same time allows simple mounting of the machine parts using an on-board crane.

According to the invention, this purpose is achieved using a wind power plant of the type named at the beginning, which has a container functioning to receive structural parts, whereby the container can be moved underneath the opening in the direction of the longitudinal axis from an operating position, in which an area of the opening near the tower is covered by the container, into a mounting position, in which this area of the opening is unblocked.

This invention is based on the discovery that an arrangement of the structural parts in a separate container, which is mounted beneath the housing, means reduced spatial requirement in the housing, which alone allows the construction of a compact housing. Furthermore, the separate container, which preferably contains electrotechnical structural parts, opens up the possibility for the replacement of the complete electrotechnical unit as a whole, which prevents time-consuming cabling work after a cable fire, for example. Since in this way even smaller forces act on the housing, materials with a lower flexural strength can be used for the housing, whereby the entire housing construction can be designed more easily, more compactly and thus more cost-effectively. Furthermore, the invention is based on the discovery that by a movability of the container from an operating position, in which an area of the opening near the tower is covered by the container, into a mounting position in which this area of the opening is unblocked, the mounting of the machine parts is additionally possible using an on-board crane. Since the pulling up of heavy machine parts using an on-board crane must be done in the vicinity of the tower that functions as a center of support, on account of the crane moments that would otherwise be out-of-control, the unblocking of the opening area of the housing near the tower by moving the container is necessary in order to allow the on-board crane to be used. Moreover, the wind power plant according to the invention makes it possible to lower a machine part that is further in front in the drive train in relation to the position of the rotor, such as the gear, without beforehand having to lower the machine parts, such as the generator, which are lying further back. Thus, the generator can stay in its mounted position when the gear is transported through the area of the opening near the tower.

It has turned out to be advantageous according to the invention if the area of the opening near the tower is used to allow the gear or parts of the gear to be moved through it using the on-board crane. Since the gear is especially heavy, the possibility for lowering it through the opening near the tower is especially significant. Lowering the gear using the on-board crane through the part of the opening that is a large distance from the tower is only possible using an on-board crane that is specially designed for this purpose on account of the very large torques acting on the crane.

In the functional embodiment form, an area of the opening that is beneath the generator is unblocked in the operating position of the container. The generator can be lowered from the housing through this area of the opening using the on-board crane. This is possible without larger problems, since the generator has a lower weight in comparison to the gear and thus can be readily held by the on-board crane in this excursion set off at a distance further away from the supporting center.

In addition, it is advantageous if the gear is arranged near the operating position of the container and is mechanically coupled to the generator by a drive connection that extends in the direction of the longitudinal axis. It is especially useful if objects can be conveyed using the on-board crane in the direction of the longitudinal axis of the housing. In this way it is possible to position machine parts which are not directly mounted above the opening, such as the gear, over an area of the opening in the housing part, first using the on-board crane in the direction of the longitudinal axis of the housing, and then to lower them along the tower through the opening on the tower.

In an especially advantageous embodiment form, the container is suspended on the housing part using running wheels that are guided on rails. A suspension using running wheels guided on rails enables problem-free movement of the container without large frictional resistance.

It has proven to be useful according to the invention, if the container serves the purpose of accommodating electric components, and power cables are provided which extend between the container and the generator and between the container and the tower, which can be folded into a loop to shorten their length when the container is moved between the operating position and the mounting position, and they can be extended to expand their length out of the looped form. The power cables in the tower and going to the container are long and flexible enough to allow movement of the container without the power cable having to be unplugged beforehand. In the container, the electric structural parts can be completely pre-cabled. The container is delivered separately to the construction site and then lifted up on the tower of the wind power plant.

In the embodiment form according to the invention, the operating position of the container can be adjusted in a continuous manner in the direction of the longitudinal axis of the housing. In this way, the eigenfrequency of the generator can be tuned to the vibrations that occur in it, so that a possible resonance catastrophe can be avoided. This possibility of the continuous adjustment of the operating position of the container is especially important for prototype systems, since here the optimal setting still needs be found.

The invention involves, furthermore, a process for the mounting and/or dismounting of a machine part of a wind power plant, in particular, a gear or gear part, in a housing that is mounted on a tower, which has a longitudinal axis that is oriented essentially transversally to the tower axis, an opening that is arranged on the underside of a housing part that is set off at a distance from the tower in the direction of the longitudinal axis, whereby the opening serves the purpose of allowing machine parts to be moved through it, and an on-board crane arranged in the housing for conveying objects.

Therefore, the purpose of the invention is to provide a process of the aforementioned type which enables a compact, more cost-effective construction of the housing and simultaneously makes possible a simple mounting of the machine parts using the on-board crane. According to the invention, the assigned purpose is achieved by a process for mounting a machine part of the aforementioned type, in which a container functioning to receive the structural components beneath the opening in the direction of the longitudinal axis of the housing is moved from an operating position, in which an area of the opening near the tower is covered by the container, into a mounting position at a larger distance from the tower, in which this area of the opening is unblocked, the on-board crane pulls the machine part along the tower and through the area of the opening near the tower, the on-board crane transports the machine part in the direction of the longitudinal axis of the housing to a planned mounting position of the machine part, and the container is moved from the mounting position back again into the operating position. Furthermore, the purpose is achieved using a process for dismounting a machine part of the type named above, in which a container functioning to receive structural parts is moved beneath the opening in the direction of the longitudinal axis of the housing from an operating position in which an area of the opening near the tower is covered by the container, into a mounting position at a larger distance from the tower, in which this area of the opening is unblocked, the on-board crane transports the machine part in the direction of the longitudinal axis of the housing to a position above the area of the opening near the tower, the on-board crane lowers the machine part along the tower through the area of the opening near the tower, and the container is moved from the mounting position back again into the operating position.

As already explained above in reference to the wind power plant according to the invention, the processes according to the invention are based on the discovery that an arrangement of the structural parts in a separate container mounted outside the housing allows construction of a more compact housing. At the same time, by the movement of the container from an operating position near the tower into a mounting position at a larger distance from the tower, the mounting of the machine parts using the on-board crane is still possible without problems.

Figure 2:
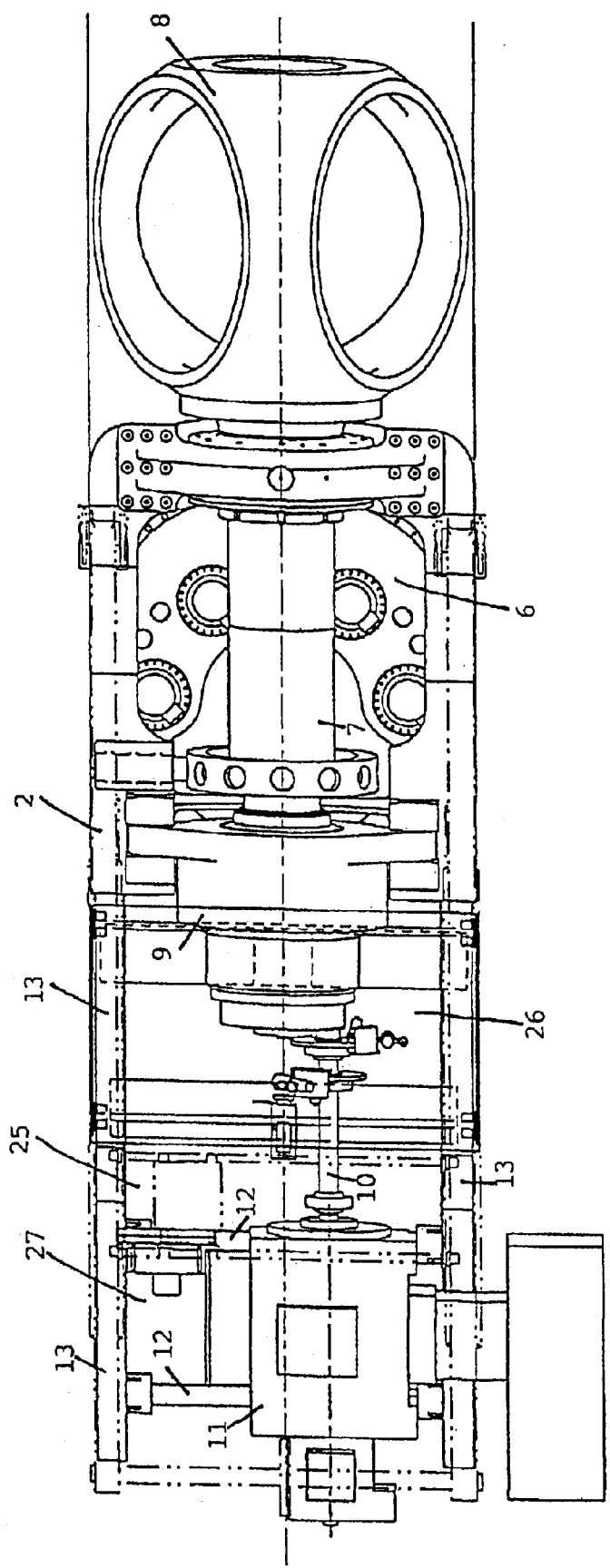

In the following, the invention is explained in reference the drawing, to which reference is expressly made with regard to all of the details characteristic of the invention. Shown in the drawing are:

FIG. 1 a side section view of the wind power plant according to the invention for the conversion of wind power into electric power, and FIG. 2 a top view of the wind power plant according to the invention for the conversion of wind power into electric power.

In FIG. 1 and FIG. 2, the main structure of a wind power plant is shown schematically according to a preferred embodiment example. On a foundation, a tower 1 is located, on the upper end of which a housing 2 is set in bearings so that it can rotate around a vertical rotational axis 3. In the diagram of FIG. 1, only the lower part of the housing 2 is shown. The housing 2 has a longitudinal axis 4 that is essentially oriented transversally to the vertical axis 3 and is set off at a distance radially from the tower 1 by a housing part 5. The main bearing 6 for the shaft 7 is located on the front end of the housing 2. The rotor 8 is affixed to this shaft 7. The rotor 8 has a hub usually with one, two or three rotor blades. The shaft 7 is mechanically connected to a gear 9, which is coupled to a generator 11 via a high-speed drive connection 10.

The generator 11 stands on feet, under which two crosswise traverses 12 run transversally to the longitudinal axis 4. The crosswise traverses 12 are affixed to two longitudinal supports 13 of the housing 5 which run in the direction of the longitudinal axis 4 and are set apart at distances. In the area 25 between the longitudinal supports, the housing part 5 up to the tower is open to the bottom or to be opened using suitable flaps. On these longitudinal supports 13, from the bottom, a container 16 functioning as a receptacle of electrical components, such as transformers and various switch cabinets, is suspended using running wheels guided on rails. This container 16 can be moved along the longitudinal supports 13 from an operating position 17 into a mounting position 18. In the operating position 17, which is assumed by the container during the normal operation of the wind power plant in order to produce electric current from wind power, the container is located near the tower and covers, from the bottom, the section 26 of the open area 25 near the tower and between the longitudinal supports. In the mounting position 18, the container 16 is located further from the tower 1, namely directly beneath the mounting position of the generator 1. In this position, the section 27, located beneath the generator 11 and away from the tower, of the open area 25 between the longitudinal supports, is covered from the bottom by the container 16. The container 16 is connected via a first power cable 19 to the generator 11 and via a second power cable 20 to the tower 1. In the operating position 17 of the container 16, the first power cable 19 assumes an extended state 21 of the first power cable, in which the first power cable 19 is extended lengthwise, and the second power cable 20 assumes a folded state 22 of the second power cable, in which the second power cable 20 is folded in a loop shape. In the mounting position 18 of the container 16 the first power cable 19 assumes a folded state 23 of the first power cable, in which the first power cable is folded in a loop shape, and the second power cable 20 assumes an extended state 24 of the second power cable, in which the second power cable 20 is extended lengthwise.

In the operating condition 17 of the container 16, the generator 11 can move through the section 27 that is far from the tower, of the open area 25 between the longitudinal supports 13 into the housing 2 and/or out of the housing 2. This occurs by means of an on-board crane 14 constructed as a pivoting portal crane, which has a frame with two pivoting crane jibs 15. In FIG. 1, the on-board crane 14 is shown in its parked position, in which it is completely housed in the housing 2. After the cover flaps of the housing 2 are swung open, the on-board crane 14 can be erected. In order to let down the generator 11, the on-board crane 14 is pivoted in such a way that the upper ends of its jibs 15 are arranged above the generator 11. After the attachments of the crosswise traverses 12 on the longitudinal supports 13 are undone, only the generator 11 including the crosswise traverses 12 can be let down and/or lifted through the section 27 of the open area 25 which is far from the tower and between the longitudinal supports.

The mounting and/or replacement of the gear 9 can then occur when the container 16 is in the mounting position 18. In this position, the section 26 of the open area 25 near the tower and between the longitudinal supports is unblocked downwards. In the process, the generator 11, when it is already located in its mounting position, does not have to be removed from the mounting position. Since the mounted gear 9 is located opposite section 26 of the open area 25 near the tower and between the longitudinal supports, at a position that is displaced in the direction of the longitudinal axis 4 towards the rotor 8, the gear 9 must first be transported for dismounting in the direction of the longitudinal axis 4 to the open area 25 between the longitudinal supports. The transport of the gear 9 within the housing 2 is done in the process by a corresponding swinging of the crane jibs 15. Next, the gear 9 can be lowered through the section 26 of the open area 25 near the tower and between the longitudinal supports. In order to mount the gear 9, it is pulled up correspondingly through the section 26 near the tower and then transported in the direction of the longitudinal axis 4 of the housing 2 to its mounting position by swinging the crane jibs 15. After a successful mounting of the gear 9, the container 16 is moved back into the position 17.

When the generator 11 is not located in its mounting position in the housing 2 during mounting of dismounting of the gear 9, the gear 9 can also be lowered and/or pulled up during the corresponding stable setting down of the on-board crane 14 while placing the container 16 into its operating position 17 through the section 27, far from the tower, of the open area 25 between the longitudinal supports.

What is claimed is:

1. A wind power plant for converting wind power into electric energy which has a tower, a housing that is mounted onto the tower and functions to receive machine parts that include at least one gear and one generator, whereby the housing also has a longitudinal axis oriented essentially crosswise to the tower axis, and, on the underside of a housing part that is set off at a distance from the tower in the direction of the longitudinal axis, has an opening that serves the purpose of allowing machine parts to be moved through it, and the wind power plant also has an on-board crane arranged in the housing in order to convey objects in the direction of the tower axis, characterized in that the wind power plant has a container functioning to receive structural parts, whereby the container can be moved underneath the opening in the direction of the longitudinal axis from an operating position, in which an area of the opening near the tower is covered by the container, into a mounting position, in which this area of the opening is unblocked.

2. The wind power plant according to claim 1, wherein the area of the opening near the tower serves the purpose of allowing the gear or parts of the gear to be moved through it using a crane.

3. The wind power plant according to one of the preceding claims, wherein,
in the operating position of the container, an area that is located beneath the generator of the opening is unblocked.

4. The wind power plant according to one of the preceding claims, wherein the gear is arranged near the operating position of the container and is coupled to the generator by a drive connection that extends in the direction of the longitudinal axis.

5. The wind power plant according to one of the preceding claims, wherein objects are conveyed using the on-board crane in the direction of the longitudinal axis of the housing.

6. The wind power plant according to one of the preceding claims, wherein the container is suspended on the housing part using running wheels that are guided on rails.

7. The wind power plant according to one of the preceding claims, wherein the container functions for receiving electric components and power cables are provided extending between the container and the generator and the container and the tower, which are foldable into a loop to shorten their length when the container is moved between the operating position and the mounting position, and they can be extended to expand their length out of the looped form.

8. The wind power plant according to one of the preceding claims, wherein the operating position of the container is adjustable in a continuous manner in the direction of the longitudinal axis of the housing.

9. A process for mounting of a machine part of a wind power plant, in particular, a gear or gear part, in a housing that is mounted on a tower, which has a longitudinal axis that is oriented essentially transversally to the tower axis, an opening that is arranged on the underside of a housing part that is set off at a distance from the tower in the direction of the longitudinal axis, whereby the opening serves the purpose of allowing machine parts to be moved through it, and an on-board crane arranged in the housing for conveying objects, the process comprising
moving a container functioning to receive the structural component beneath the opening in the direction of the longitudinal axis of the housing from an operating position, in which an area of the opening near the tower is covered by the container, into a mounting position at a larger distance from the tower, in which this area of the opening is unblocked,
the on-board crane pulling the machine part along the tower and through the area of the opening near the tower, the on-board crane transporting the machine part in the direction of the longitudinal axis of the housing to a planned mounting position of the machine part, and moving the container from the mounting position back again into the operating position.

10. A process for dismounting a machine part of a wind power plant, in particular, a gear or gear part, in a housing that is mounted on a tower, which has a longitudinal axis that is oriented essentially transversally to the tower axis, an opening that is arranged on the underside of a housing part that is set off at a distance from the tower in the direction of the longitudinal axis, the opening serving the purpose of allowing machine parts to be moved through it, and an on-board crane arranged in the housing for conveying objects, the process comprising moving a container functioning to receive the structural components beneath the opening in the direction of the longitudinal axis of the housing from an operating position in which an area of the opening near the tower is covered by the container, into a mounting position at a larger distance from the tower, in which this area of the opening is unblocked, the on-board crane transporting the machine part in the direction of the longitudinal axis of the housing to a position above the area of the opening near the tower, the on-board crane letting the machine part down along the tower through the area of the opening near the tower, and moving the container from the mounting position back again into the operating position.

* * * * *